United States Patent
Brace et al.

(10) Patent No.: US 10,533,926 B2
(45) Date of Patent: Jan. 14, 2020

(54) AUTOMATIC ANALYSIS OF A SET OF OPTICAL FIBERS OF AN OPTICAL CABLE

(71) Applicant: VIAVI Solutions Inc., San Jose, CA (US)

(72) Inventors: Jay Brace, Bothell, WA (US); Kevin Cassady, Monroe, WA (US)

(73) Assignee: VIAVI Solutions Inc., San Jose, CA (US)

(*) Notice: Subject to any disclaimer, the term of this patent is extended or adjusted under 35 U.S.C. 154(b) by 0 days.

(21) Appl. No.: 16/553,383

(22) Filed: Aug. 28, 2019

(65) Prior Publication Data

US 2019/0383698 A1 Dec. 19, 2019

Related U.S. Application Data

(63) Continuation of application No. 15/367,329, filed on Jun. 29, 2017, now Pat. No. 10,401,258.

(51) Int. Cl.
*G01M 11/00* (2006.01)
*G02B 6/38* (2006.01)
*G02B 21/00* (2006.01)

(52) U.S. Cl.
CPC .......... *G01M 11/30* (2013.01); *G02B 6/385* (2013.01); *G02B 21/0004* (2013.01)

(58) Field of Classification Search
CPC .......... G02B 21/002; G02B 21/0024; G02B 21/0028; G02B 21/0036; G02B 21/008; G02B 21/0004; G02B 21/0016; G02B 21/0096; G02B 7/003; G02B 7/004; G02B 7/005; G02B 6/2555; G02B 6/3803; G02B 6/3843; G02B 6/385; G01B 11/26; G01B 11/27; G01B 11/272; G01B 11/30; G01B 11/303; G01N 21/88; G01N 21/8803; G01N 21/8806; G01N 21/94; G01N 21/95; G01N 21/952; G01N 21/9515; G01N 21/942; G01N 21/958; G01N 2021/9511; G01M 11/088; G01M 11/30; G01M 11/31; G01M 11/33; G01M 11/331; G01M 11/332; G01M 11/335; G01M 11/39
USPC .................. 356/73.1, 237.1–237.6, 399–401
See application file for complete search history.

(56) References Cited

U.S. PATENT DOCUMENTS

| | | | | |
|---|---|---|---|---|
| 6,045,398 A | * | 4/2000 | Narita | C07D 209/08 439/500 |
| 6,466,366 B1 | * | 10/2002 | Dominique | G02B 6/3807 356/73.1 |
| 6,751,017 B2 | | 6/2004 | Cassady et al. | |

(Continued)

*Primary Examiner* — Gordon J Stock, Jr.
(74) *Attorney, Agent, or Firm* — Harrity & Harrity, LLP

(57) ABSTRACT

A device for connecting to an optical cable having a set of optical fibers may include a microscope, an assembly to move the microscope in a continuous manner about an axis substantially parallel to a mating surface of the optical cable, and without moving the device, to bring one or more optical fibers, of the set of optical fibers, within a field of view of the microscope without moving the optical cable, and one or more processors. The device may receive an indication to perform a set of analyses of the set of optical fibers of the optical cable. The device may perform the set of analyses of the set of optical fibers by modifying a position of the microscope of the assembly of the device in a set of directions. The device may output a result of the set of analyses for display.

20 Claims, 10 Drawing Sheets

(56) References Cited

U.S. PATENT DOCUMENTS

| | | | | |
|---|---|---|---|---|
| 7,042,562 | B2* | 5/2006 | Kiani | G02B 6/3807 |
| | | | | 356/237.1 |
| 7,336,884 | B2* | 2/2008 | Zhou | G02B 6/3833 |
| | | | | 359/368 |
| 9,110,252 | B2* | 8/2015 | Zhou | G02B 6/3866 |
| 9,482,594 | B2 | 11/2016 | Leigh et al. | |
| 9,841,567 | B1 | 12/2017 | Zhou et al. | |
| 9,841,579 | B2* | 12/2017 | Baribault | H04N 5/2252 |
| 10,101,570 | B1 | 10/2018 | Zhou et al. | |
| 10,175,142 | B2* | 1/2019 | Lafrance | G01M 11/30 |
| 10,254,196 | B2* | 4/2019 | Zhou | G01M 11/30 |
| 10,401,258 | B2 | 9/2019 | Brace et al. | |
| 2008/0019656 | A1 | 1/2008 | Zhou et al. | |
| 2008/0304051 | A1 | 12/2008 | Wells et al. | |
| 2013/0229650 | A1 | 9/2013 | Wilson et al. | |
| 2014/0268114 | A1 | 9/2014 | Zhou et al. | |
| 2015/0092043 | A1 | 4/2015 | Baribault et al. | |
| 2016/0291257 | A1 | 10/2016 | Huang et al. | |
| 2017/0003195 | A1 | 1/2017 | Lafrance et al. | |

* cited by examiner

AUTOMATIC ANALYSIS OF A SET OF OPTICAL FIBERS OF AN OPTICAL CABLE

RELATED APPLICATION

This application is a continuation of U.S. patent application Ser. No. 15/637,329, filed Jun. 29, 2017 (now U.S. Pat. No. 10,401,258), the content of which is incorporated herein by reference in its entirety.

BACKGROUND

A microscope may include an instrument used to see objects that are too small to be seen by the naked eye. Microscopy may include investigating small objects and structures using a microscope. A microscope may include an optical microscope, which uses light to pass through a sample to produce an image, a fluorescence microscope, an electron microscope, a scanning probe microscope, and/or the like.

SUMMARY

According to some possible implementations, a device for connecting to an optical cable having a set of optical fibers may include a microscope, an assembly to move the microscope in a continuous manner about an axis substantially parallel to a mating surface of the optical cable, and without moving the device, to bring one or more optical fibers, of the set of optical fibers, within a field of view of the microscope without moving the optical cable, and one or more processors. The one or more processors may be configured to receive an indication to perform a set of analyses of the set of optical fibers of the optical cable. The one or more processors may be configured to perform the set of analyses of the set of optical fibers by modifying a position of the microscope of the assembly of the device in a set of directions. The one or more processors may be configured to output a result of the set of analyses for display.

According to some possible implementations, a device for connecting to an optical cable having a set of optical fibers may include one or more components associated with a microscope. The device may include an assembly that can move, in a continuous manner, the one or more components of the device about an axis substantially parallel to a mating surface of the optical cable to bring the set of optical fibers of the optical cable within a field of view of the one or more components without moving the optical cable and without moving the device. The one or more components may include a camera, and a lens associated with the camera. The assembly may include a set of motors.

According to some possible implementations, a method may include receiving, by a device, an indication to perform a set of analyses of a set of optical fibers of an optical cable to which the device is connected. The method may include performing, by the device, the set of analyses of the set of optical fibers by modifying a position of a microscope of an assembly of the device in a set of directions. The assembly may move, in a continuous manner, the microscope about an axis substantially parallel to a mating surface of the optical cable to bring each optical fiber, of the set of optical fibers, within a field of view of the microscope without moving the optical cable and without moving the device. The microscope may be used to perform the set of analyses. The method may include determining, by the device, results of performing the set of analyses. The method may include performing, by the device, an action related to the results of the set of analyses.

DETAILED DESCRIPTION

The following detailed description of example implementations refers to the accompanying drawings. The same reference numbers in different drawings may identify the same or similar elements.

A technician may need to analyze (e.g., inspect) a set of optical fibers included in an optical cable (e.g., a ribbon optical cable) for defects, damage, and/or the like. The technician may want to use a device (e.g., a handheld device, such as a handheld microscope) to analyze the optical fibers. However, the device may lack a technique for automatically analyzing the set of optical fibers. This may reduce an efficiency of analyzing a set of optical fibers via increased time for analyzing the set of optical fibers, errors in analyzing the set of fibers, such as failing to perform an analysis of an optical fiber included in the set of optical fibers, non-objectively analyzing the set of fibers, and/or the like. In addition, to inspect various optical fibers included in the set of optical fibers, the device and/or the technician may have to move the optical fibers into a field of view of the device (e.g., rather than a lens associated with the device moving the field of view of the device to analyze the set of optical fibers while the set of optical fibers remain stationary). This may require the technician to manually move the set of optical fibers for analysis, which may introduce even further time and errors in analyzing the set of fibers and may result in damage to the set of fibers.

Some implementations, described herein, provide a device (e.g., a handheld device, such as a handheld microscope) that includes an assembly for analyzing a set of optical fibers that can pivot, or rotate, about an axis so as to modify a field of view of the device (e.g., without moving the set of optical fibers). In addition, the device may be capable of automatically analyzing a set of optical fibers for defects, damage, and/or the like. In this way, the device may automatically analyze a set of optical fibers without moving the set of optical fibers. This reduces or eliminates a need for a set of optical fibers to be moved (manually or otherwise) to analyze the set of optical fibers. In addition, this increases an efficiency, an accuracy, and an objectivity of analyzing a set of optical fibers via automatic analysis of the set of optical fibers, thereby conserving processing resources of the device that would otherwise be consumed performing multiple analyses to correct for missed optical fibers, fixing optical fibers that were inaccurately identified as damaged and/or defective, and/or the like.

Figure 1A:
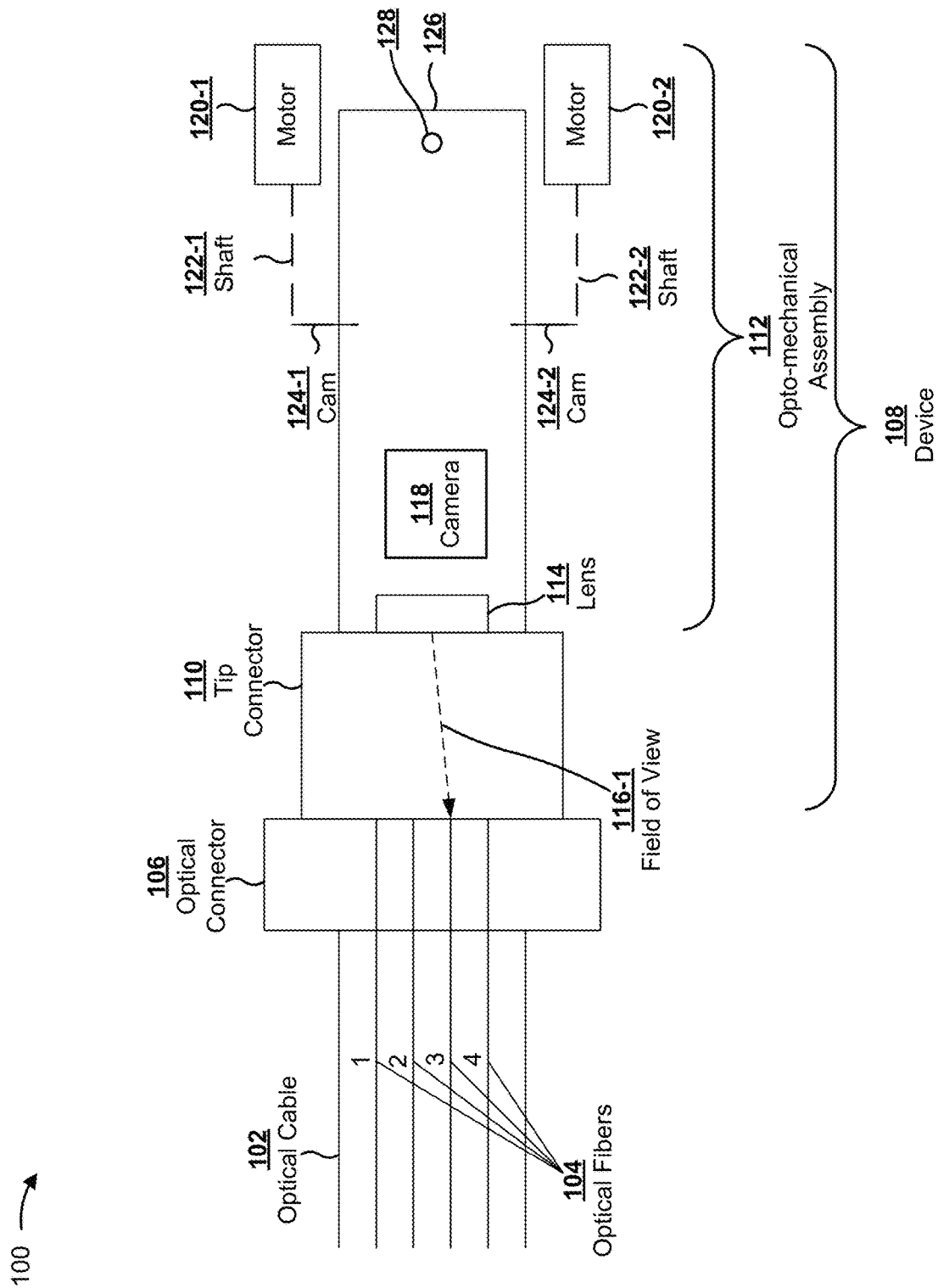
FIGS. 1A-1E are diagrams of an overview of an example implementation described herein.

FIGS. 1A-1E are diagrams of an overview of an example implementation 100 described herein. As shown in FIG. 1A, implementation 100 may include an optical cable 102 that includes a set of optical fibers one through four (referred to herein as optical fibers 104-1 through 104-4 respectively), and an optical connector 106 that is attached to optical cable 102. Further, implementation 100 includes a device 108 (e.g., a handheld device 108) to be used to analyze optical fibers 104-1 through 104-4. Device 108 includes a tip connector 110 that permits device 108 to attach to optical cable 102 via optical connector 106. Further, device 108 includes an opto-mechanical assembly 112 to be used to move a microscope relative to optical fibers 104-1 through 104-4 to obtain (e.g., capture) a set of images and/or video of optical fibers 104-1 through 104-4 and/or to analyze optical fibers 104-1 through 104-4.

Opto-mechanical assembly 112 includes various components to be used to analyze optical fibers 104-1 through 104-4 (e.g., electronic components, optical components, mechanical components, etc.). For example, opto-mechanical assembly 112 may include a microscope that includes a lens 114 for viewing optical fibers 104-1 through 104-4. As shown by reference number 116-1, lens 114 may be focused on a point within a field of view (e.g., optical fiber 104-3), such as upon attachment of device 108 to optical cable 102. The focus of lens 114 may depend on an angle of pivot of the microscope of opto-mechanical assembly 112 (e.g., rather than an angle of pivot of optical components of opto-mechanical assembly 112 and/or device 108, such as lens 114, a prism, a mirror, etc.), as described in more detail below. As further shown in FIG. 1A, the microscope of opto-mechanical assembly 112 may include a camera 118 to be used to capture a set of images and/or video of optical fibers 104-1 through 104-4. For example, camera 118 may capture a set of images and/or video that are to be analyzed by device 108 (or another device communicatively connected to device 108) to identify a defect, damage, and/or the like related to optical fibers 104-1 through 104-4. Continuing with the previous example, device 108 may provide the set of images and/or video to a server or a computing resource (e.g., of a cloud computing environment) to permit the server or computing resource to perform an analyses of the set of images and/or video. In this way, opto-mechanical assembly 112 may include a microscope that can be used to analyze a set of optical fibers 104.

Opto-mechanical assembly 112 may further include motors 120-1 through 120-2 (e.g., step motors). Motors 120-1 through 120-2 may extend or retract shafts 122-1 and 122-2 connected to cams 124-1 and 124-2, respectively, so as to modify a position of the microscope of opto-mechanical assembly 112, relative to optical fibers 104-1 through 104-4, in a first direction (e.g., toward a top portion of FIG. 1A, referred to herein as a positive x direction), a second direction (e.g., toward a bottom portion of FIG. 1A, referred to herein as a negative x direction), and/or a third direction (e.g., toward a left portion of FIG. 1A or a right portion of FIG. 1A, referred to herein as a positive y direction and a negative y direction, respectively).

The positive and negative x directions may be parallel to a mating surface of optical cable 102 (e.g., a microscope of opto-mechanical assembly 112 may pivot about an axis parallel to a mating surface of optical cable 102, opto-mechanical assembly 112 may move a microscope and/or camera parallel to a cross-section of optical cable 104, etc.). Similarly, the positive and negative x directions may be substantially parallel to a mating surface of optical cable 102. For example, the positive and negative x directions may include an arcing motion, an angled motion, and/or the like.

A mating surface of optical cable 102 may include a surface of optical cable 102 where ends of optical fibers 104 are exposed such that device 108 can perform an analysis of optical fibers 104. Additionally, or alternatively, a mating surface of optical cable 102 may include a surface of optical cable 102 that device 108 (e.g., a microscope of opto-mechanical assembly 112) analyzes. In this way, opto-mechanical assembly 112 of device 108 may move a microscope in a continuous manner about an axis that is substantially parallel to a mating surface of optical cable 102, and without moving device 108, to bring optical fibers 104 of optical cable 102 within a field of view of the microscope without moving optical cable 102.

In this way, motor 120-1 may modify an angle of pivot of a microscope of opto-mechanical assembly 112 (e.g., in a positive x direction or a negative x direction), thereby modifying a field of view of the microscope of opto-mechanical assembly 112, so that the microscope of opto-mechanical assembly 112 can be used to analyze optical fibers 104-1 through 104-4, as described in more detail elsewhere herein. In addition, in this way, motor 120-2 may modify a distance of lens 114 from a set of optical fibers 104 that device 108 is analyzing (e.g., to permit lens 114 to focus on a particular optical fiber 104), as described in more detail elsewhere herein.

In this way, opto-mechanical assembly 112 may include a set of motors 120 to modify a position of a microscope associated with opto-mechanical assembly 112 relative to a set of optical fibers 104 to perform an analysis of the set of optical fibers 104. In addition, in this way, opto-mechanical assembly 112 may include a set of motors 120 to modify a position of a microscope associated with opto-mechanical assembly 112 independently of device 108 (e.g., without moving device 108).

In some implementations, opto-mechanical assembly 112 may include motors to move a microscope associated with opto-mechanical assembly 112 in other planes. For example, opto-mechanical assembly 112 may include motors to move a microscope of opto-mechanical assembly 112 in x and y planes, in x, y, and z planes, etc. This permits a microscope associated with opto-mechanical assembly 112 to analyze optical fibers 104 in a variety of planes. For example, although implementation 100 shows four optical fibers 104, optical cable 102 may include multiple rows and/or columns of optical fibers 104 that include tens, hundreds, thousands, etc. of optical fibers 104. In some implementations, each of optical fibers 104-1 through 104-4 may be a set of optical fibers 104, where a microscope of opto-mechanical assembly 112 can perform an analysis of each optical fiber 104 included in the sets of optical fibers 104-1 through 104-4 when a set of optical fibers 104 is within a field of view of a microscope associated with opto-mechanical assembly 112.

Device 108 may further include a set of housings that mechanically support components of device 108. For example, device 108 may include a housing (not shown) that permits a user to handle device 108 and that contains opto-mechanical assembly 112. As another example, device 108 may include a housing 126 that mechanically supports the various components of opto-mechanical assembly 112 and/or device 108 (e.g., within another housing of device 108), such as tip connector 110, a microscope (e.g., lens 114, camera 118, etc.), motors 120-1 and 120-2, shafts 122-1 and 122-2, cams 124-1 and 124-2, and/or the like. Housing 126 may include a pivot 128 that permits a microscope of opto-mechanical assembly 112 to pivot about an axis in a first direction or a second direction. For example, pivot 128 may permit modification of an angle of pivot of a microscope associated with opto-mechanical assembly 112 in the positive or negative x direction (described above), thereby permitting a microscope associated with opto-mechanical assembly 112 to focus on each of optical fibers 104-1 through 104-4 via modification of the field of view of a microscope of opto-mechanical assembly 112, as described in more detail elsewhere herein.

Figure 1B:
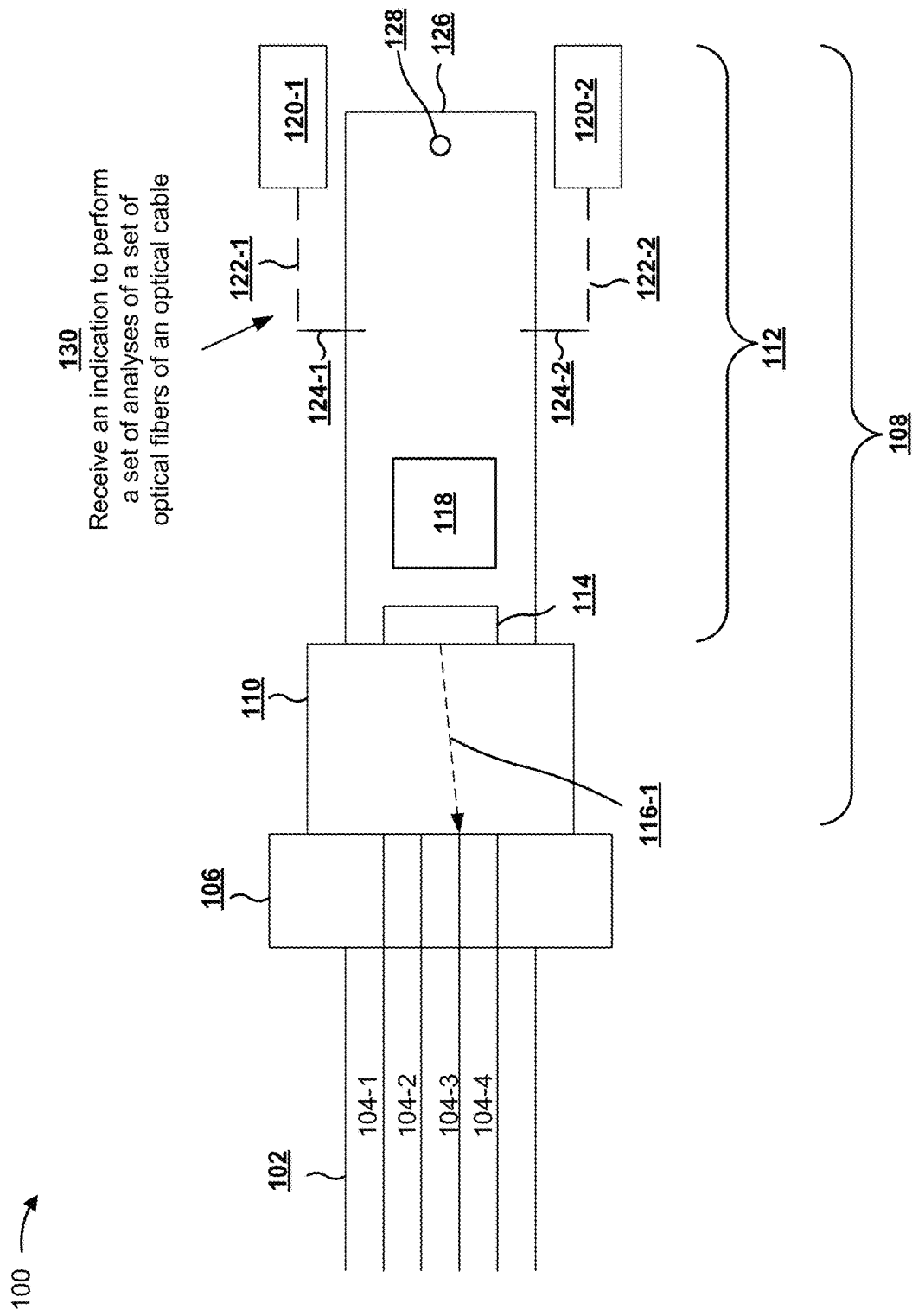

As shown in FIG. 1B, and by reference number 130, device 108 may receive an indication to perform a set of analyses of a set of optical fibers of an optical cable to which device 108 is connected (e.g., attached). For example, device 108 may receive an indication to perform a set of analyses of optical fibers 104-1 through 104-4. Device 108 may receive the indication when device 108 is connected to optical cable 102, based on input from a user of device 108, and/or the like.

Figure 1C:
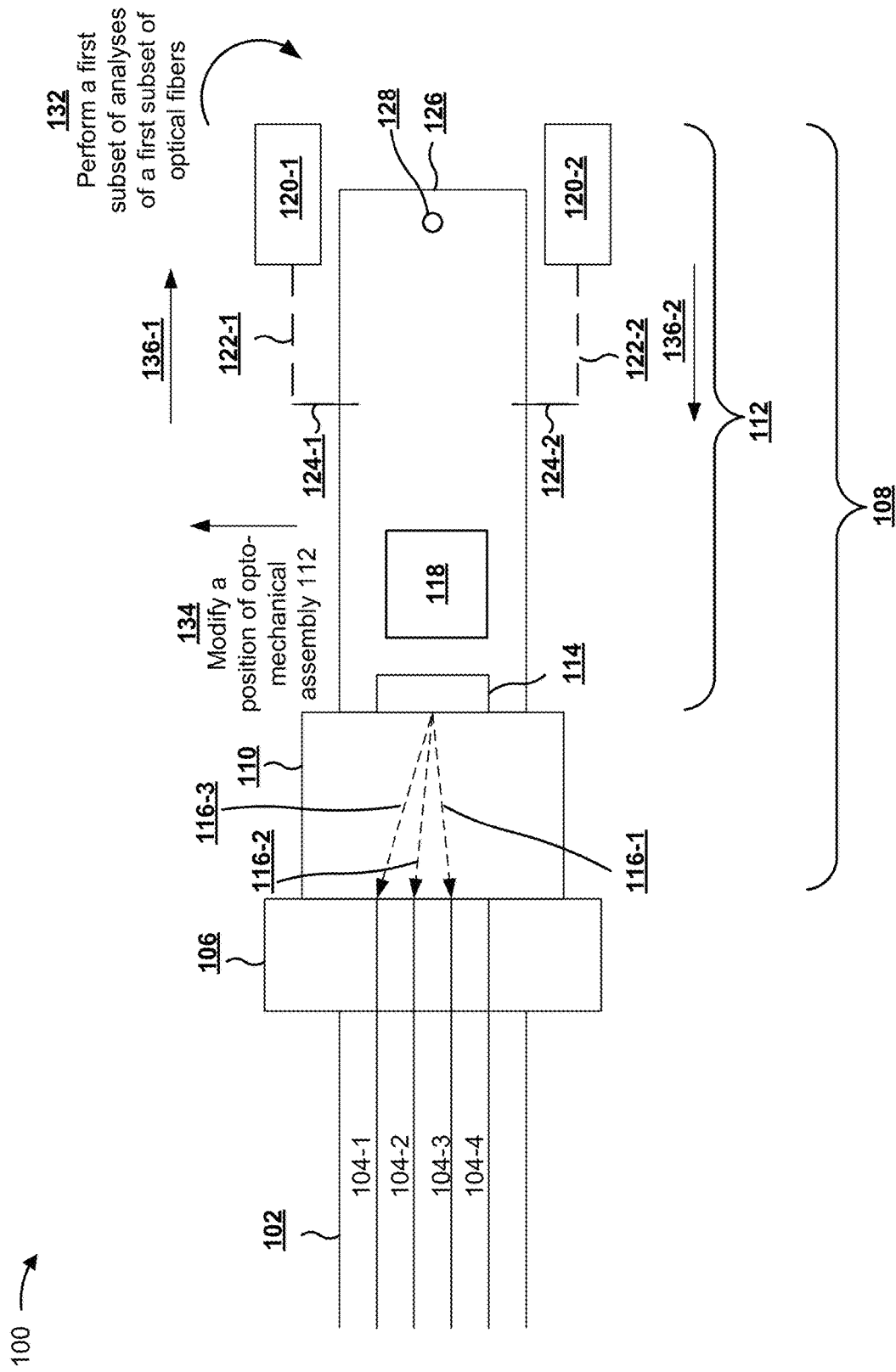

As shown in FIG. 1C, and by reference number 132, device 108 may perform a first subset of analyses of a first subset of optical fibers by modifying a position of a microscope of opto-mechanical assembly 112. For example, device 108 may perform a first subset of analyses of optical fibers 104-1 through 104-3 by modifying a position of a microscope associated with opto-mechanical assembly 112. When modifying a position of a microscope associated with opto-mechanical assembly 112, opto-mechanical assembly 112 may modify the position of the microscope relative to optical fibers 104-1 through 104-4 and independently of device 108.

Continuing with the previous example, device 108 may autofocus lens 114 on optical fiber 104-3 based on an angle of pivot of a microscope of opto-mechanical assembly 112 placing optical fiber 104-3 in a field of view of lens 114 (e.g., as shown by reference number 116-1). Device 108 may perform an analysis of optical fiber 104-3, such as by capturing an image and/or video of optical fiber 104-3 and using image processing, computer vision, and/or the like to identify a defect, damage, etc. related to optical fiber 104-3. Device 108 may determine that an optical fiber 104 is within a field of view of lens 114 prior to performing an analysis of optical fiber 104 (e.g., using a shape detection technique, such as circle Hough Transform (CHT)).

As shown by reference number 134, device 108 may modify a position of a microscope of opto-mechanical assembly 112. For example, device 108 may modify a position of a microscope associated with opto-mechanical assembly 112 in the positive x direction (e.g., rather than modifying optical components of opto-mechanical assembly 112 and/or device 108, such as lens 114, a mirror, a prism, etc.), such as to have optical fiber 104-2 within the field of view of lens 114 (e.g., as shown by reference number 116-2). When modifying a position of a microscope associated with opto-mechanical assembly 112 in a positive x direction, opto-mechanical assembly 112 may modify the position of the microscope relative to optical fibers 104 and independently of device 108 (e.g., without moving optical fibers 104 and/or device 108).

Various mechanical components of opto-mechanical assembly 112 may perform various actions to modify a position of a microscope of opto-mechanical assembly 112. For example, and as shown by reference number 136-1, motor 120-1 may retract shaft 122-1 to modify a position of a microscope of opto-mechanical assembly 112 in the positive x direction (e.g., via movement of cam 124-1). The movement in the positive x direction may be continuous rather than discrete (e.g., rather than moving to or between discrete positions). In other words, a microscope of opto-mechanical assembly 112 may pivot in the positive x direction and may analyze optical fibers 104 without pausing the movement of the microscope of opto-mechanical assembly 112 to perform an analysis of the optical fibers 104. In addition, as shown by reference number 136-2, motor 120-2 may extend shaft 122-2 to modify a position of lens 114 in a positive y direction toward optical fiber 104-2 to focus lens 114 on optical fiber 104-2, to zoom in on optical fiber 104-2, and/or the like (e.g., via movement of cam 124-2).

After optical fiber 104-2 is within the field of view of lens 114 (e.g., based on movement of a microscope of opto-mechanical assembly 112 in the positive x direction), device 108 may perform an analysis of optical fiber 104-2 in a manner similar to that described above with respect to optical fiber 104-3. In addition, device 108 may determine a distance between optical fiber 104-2 and optical fiber 104-3 based on an angle of pivot of a microscope of opto-mechanical assembly 112 between optical fiber 104-2 and 104-3, a speed at which a microscope of opto-mechanical assembly 112 pivoted between optical fiber 104-2 and optical fiber 104-3, an amount of time a microscope of opto-mechanical assembly 112 pivoted between optical fiber 104-2 and optical fiber 104-3, by taking a measurement of the distance between optical fiber 104-2 and optical fiber 104-3, and/or the like. Device 108 may use the determined distance to determine when opto-mechanical assembly 112 has analyzed the last optical fiber in the set of optical fibers (e.g., optical fibers 104-1 and 104-4) and to determine an initial position of a microscope of opto-mechanical assembly 112, as described below.

As shown by reference number 116-3, device 108 may continue to modify the position of a microscope of opto-mechanical assembly 112 in the positive x direction, such that optical fiber 104-1 is brought within the field of view of lens 114, in a manner similar to that described above (e.g., in a continuous manner, by modifying a position of opto-mechanical assembly 112 rather than optical components of opto-mechanical assembly 112 and/or device 108, etc.). Device 108 may perform an analysis of optical fiber 104-1 in a manner similar to that described above. In addition, device 108 may determine a distance between optical fibers 104-1 and 104-2 in a manner similar to that described above. Device 108 may continue to modify a position of a microscope of opto-mechanical assembly 112 in the positive x direction until the position has been modified by a threshold amount (e.g., a threshold distance, a threshold angle, etc.) without detecting another optical fiber 104. In this way, device 108 may automatically determine that device 108 has analyzed the last optical fiber 104 in a set of optical fibers while moving a microscope in a first direction (e.g., in a positive x direction) relative to a set of optical fibers 104 and without moving device 108.

Figure 1D:
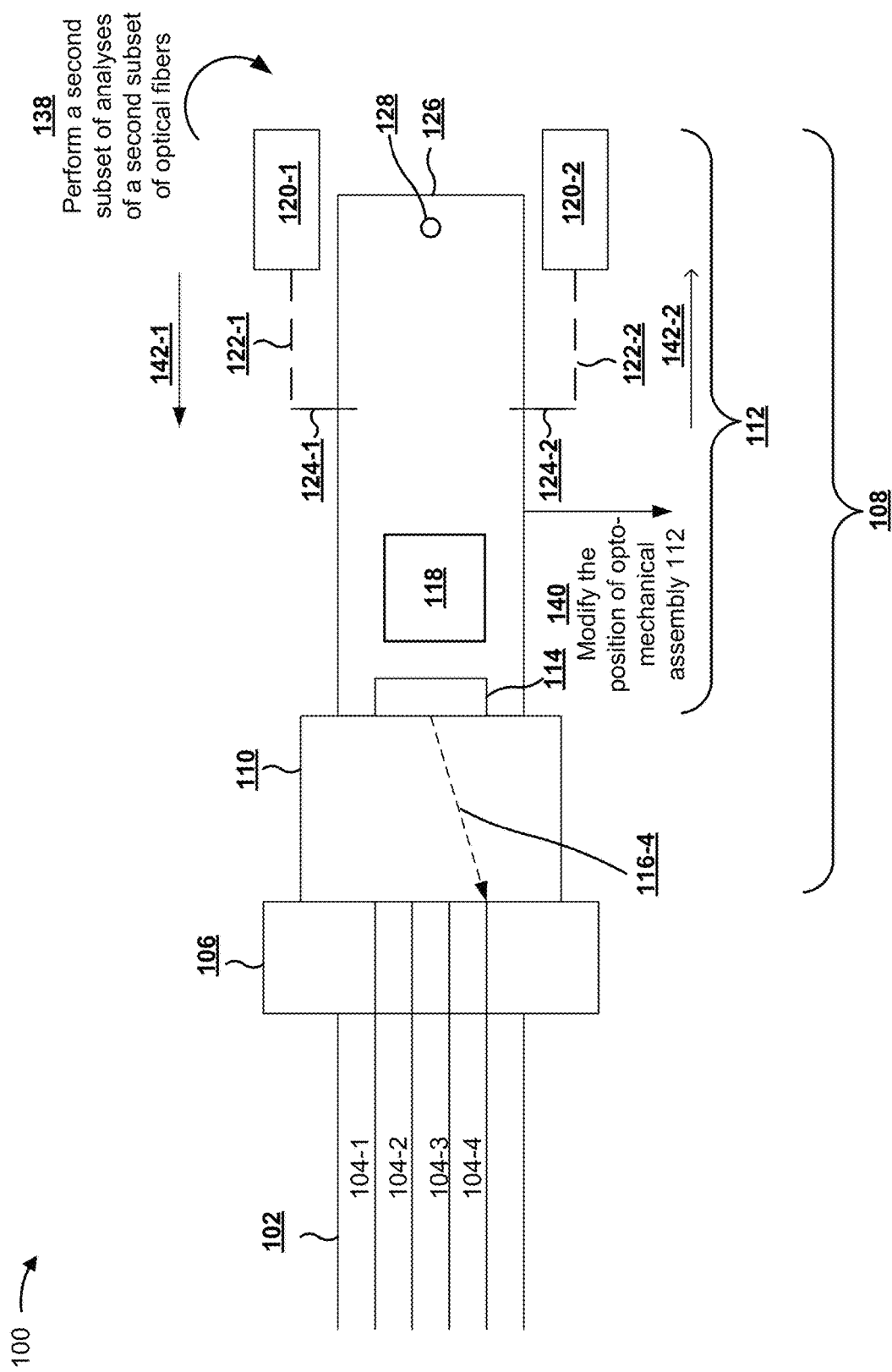

As shown in FIG. 1D, and by reference number 138, device 108 may perform a second subset of analyses of a second subset of optical fibers by modifying the position of a microscope of opto-mechanical assembly 112. For example, device 108 may perform a second subset of analyses of optical fiber 104-4 by modifying the position of a microscope associated with opto-mechanical assembly 112. As shown by reference number 140, device 108 may bring optical fiber 104-4 within a field of view of lens 114 by modifying the position of a microscope of opto-mechanical assembly 112 in a negative x direction. When modifying a position of a microscope associated with opto-mechanical assembly 112, opto-mechanical assembly 112 may modify the position of the microscope relative to a set of optical fibers 104 and independently of moving device 108 (e.g., without moving device 108).

As shown by reference number 142-1, motor 120-1 may extend shaft 122-1 to cause a microscope of opto-mechanical assembly 112 to pivot about pivot 128 in a negative x direction via movement of cam 124-1. The movement in the negative x direction may be continuous rather than discrete (e.g., rather than moving to or between discrete positions). In other words, a microscope associated with opto-mechanical assembly 112 may pivot in the negative x direction and may analyze optical fibers 104 without pausing the movement of the microscope of opto-mechanical assembly 112. In addition, and as shown by reference number 142-2, motor 120-2 may retract shaft 122-2 in conjunction with the movement of motor 120-1 to cause lens 114 to move in a negative y direction via movement of cam 124-2, thereby causing lens 114 to zoom out from optical fiber 104-4, to modify a focus of lens 114, and/or the like.

Movement of a microscope of opto-mechanical assembly 112 in the negative x direction may bring optical fiber 104-4 within the field of view of lens 114 (as shown by reference number 116-4). A microscope of opto-mechanical assembly 112 may move in a manner similar to that described above (e.g., in a continuous manner rather than a discrete manner, by modifying a position of a microscope of opto-mechanical assembly 112 rather than optical components of opto-mechanical assembly 112 and/or device 108, etc.). Device 108 may determine an angle of pivot needed to bring optical fiber 104-4 within the field of view based on the determined distance between each of optical fibers 104-1 through 104-3 (e.g., an average distance), based on a total distance a microscope of opto-mechanical assembly 112 pivoted in the positive x direction (e.g., to determine an initial position of a microscope of opto-mechanical assembly 112), detecting the presence of optical fiber 104-4 within the field of view of lens 114 (e.g., using image processing, a circle Hough Transform (CHT) technique, etc.), and/or the like.

Device 108 may perform an analysis of optical fiber 104-4 in a manner similar to that described with respect to optical fibers 104-1 through 104-3. Device 108 may determine that optical fiber 104-4 is the last optical fiber in the set of optical fibers in the negative x direction by continuing to pivot a microscope associated with opto-mechanical assembly 112 in the negative x direction, in a manner similar to that described above with respect to the positive x direction.

In this way, device 108 may automatically analyze a set of optical fibers 104 without needing to receive information regarding a quantity of optical fibers 104 included in the set of optical fibers 104, a position of an initially analyzed optical fiber 104 relative to other optical fibers 104 in the set of optical fibers 104, and/or the like. This increases an efficiency, an accuracy, and an objectivity of analyzing a set of optical fibers 104 (e.g., relative to a non-automated analysis and/or an analysis that needs input from a user related to a quantity of optical fibers 104 in the set of optical fibers 104, a position of the first analyzed optical fiber 104 relative to other optical fibers 104 in the set of optical fibers 104, etc.).

Figure 1E:
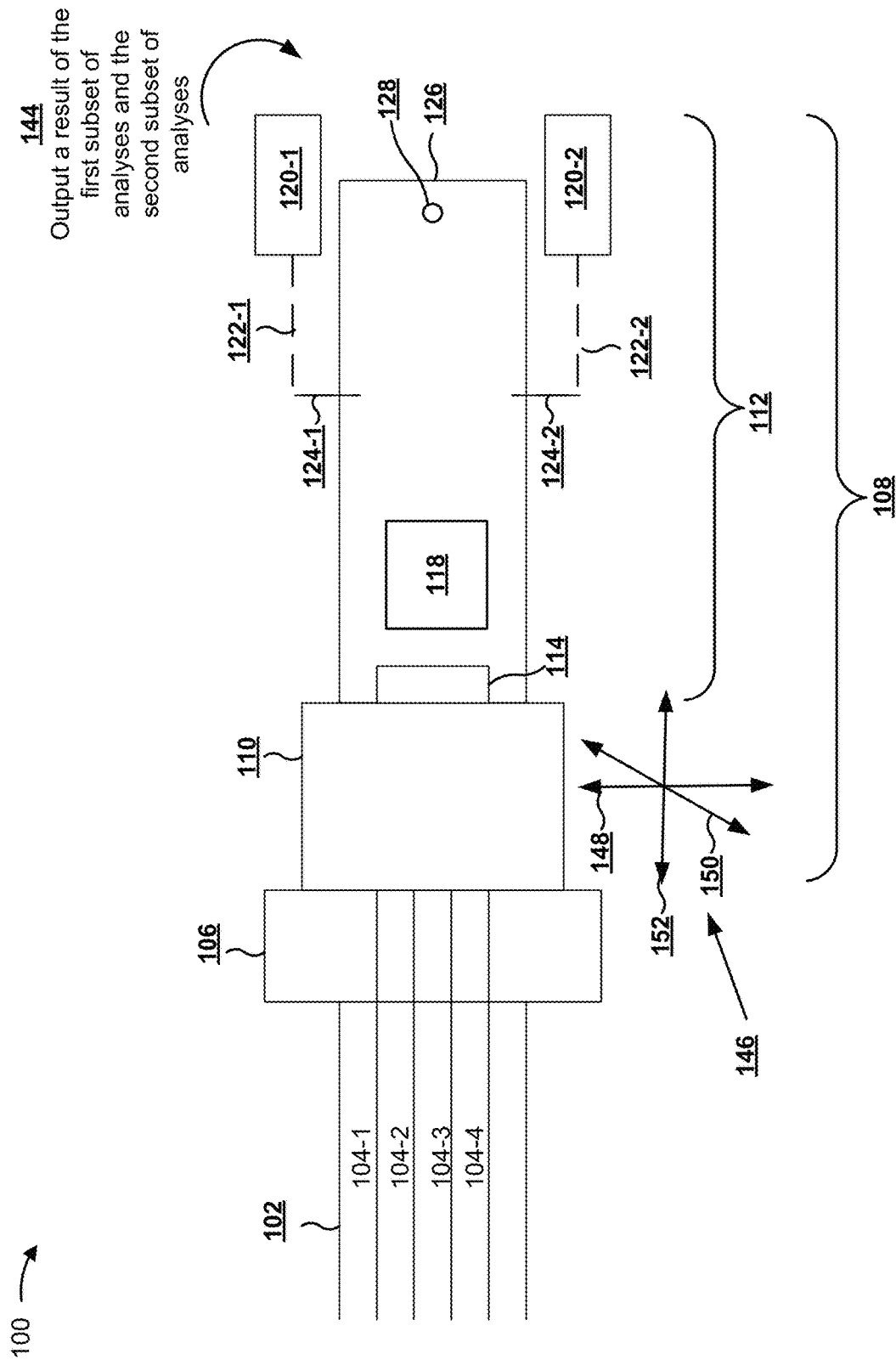

As shown in FIG. 1E, and by reference number 144, device 108 may output a result of the first subset of analyses (e.g., the analyses of optical fibers 104-1 through 104-3) and the second subset of analyses (e.g., the analyses of optical fiber 104-4). For example, device 108 may output the result for display (e.g., via a display of device 108), to an external client device (e.g., a laptop computer, a mobile phone, etc.), via a wired connection (e.g., a universal serial bus (USB) connection), via a wireless connection (e.g., a Bluetooth connection, a Wi-Fi connection, etc.), and/or the like.

Reference number 146 shows example movements of a microscope of opto-mechanical assembly 112. For example, reference number 148 shows movement of a microscope of opto-mechanical assembly 112 in a positive or negative x direction, as described above with respect to reference numbers 134 and 140. Continuing with the previous example, the movement shown by reference number 148 may be about an axis that is parallel, or substantially parallel, to a mating surface of optical cable 102 (e.g., an axis associated with pivot 128).

Additionally, or alternatively, and as another example, reference number 150 shows movement of a microscope of opto-mechanical assembly 112 in another direction (e.g., a positive or negative y direction). Continuing with the previous example, the movement shown by reference number 150 may be perpendicular, or substantially perpendicular, to the movement shown by reference number 148, but still about an axis parallel, or substantially parallel, to a mating surface of optical cable 102. In this way, opto-mechanical assembly 112 may modify a position of a microscope about an axis that is substantially perpendicular to another axis and substantially parallel to a mating surface of optical cable 102.

Additionally, or alternatively, and as another example, reference number 152 shows movement of a microscope of opto-mechanical assembly 112 in another direction (e.g., in a positive or negative z direction). In this way, opto-mechanical assembly 112 may modify a position of a microscope along an axis that is substantially perpendicular to another axis and substantially perpendicular to a mating surface of optical cable 102.

Continuing with the previous example, the movement shown by reference number 152 may be perpendicular, or substantially perpendicular, to a mating surface of optical cable 102 rather than parallel to the mating surface of optical cable 102, substantially parallel to the mating surface of optical cable 102, and/or the like. For example, the movement shown by reference number 152 may be perpendicular, or substantially perpendicular, to the movement shown by reference numbers 148 and/or 150, normal, or substantially normal, to a mating surface of optical cable 102, and/or the like.

In this way, a device may automatically analyze a set of optical fibers without moving the set of optical fibers. This reduces or eliminates a need to move the set of optical fibers to analyze the set of optical fibers. In addition, this increases an efficiency, and an accuracy, of analyzing a set of optical fibers via automatic analysis of the set of optical fibers, thereby conserving processing resources of the device that would otherwise be consumed performing multiple analyses to correct for missed optical fibers, fixing optical fibers that were inaccurately identified as damaged and/or defective, and/or the like.

As indicated above, FIGS. 1A-1E are provided merely as an example. Other examples are possible and may differ from what was described with regard to FIGS. 1A-1E. For example, although FIGS. 1A-1E were described with respect to a microscope, the implementations apply equally to other types of devices that can be used to perform an analysis of a set of optical fibers of an optical cable. In addition, rather than starting at an arbitrary position and performing a first subset of analyses and a second subset of analyses, a microscope may perform an analysis of a set of optical fibers in a different manner. For example, a device may modify a position of a microscope of an assembly in a first direction until the microscope identifies the last optical fiber in the first direction (e.g., without performing a set of analyses in the first direction). Continuing with the previous example, the device may then modify the position of the microscope of the assembly in a second direction and may perform an analysis of the set of optical fibers while modifying the position of the microscope of the assembly in the second direction until the device determines that the device has performed an analysis of the last optical fiber of the set of optical fibers in the second direction.

In some implementations, a device may move the microscope of the assembly to determine the bounds of the cable prior to performing an analysis. For example, the device may determine the last optical fiber in a set of directions and then may analyze the optical fibers of the optical cable after determining the dimensions of the optical cable, a quantity of optical fibers in the optical cable, and/or the like.

Figure 2:
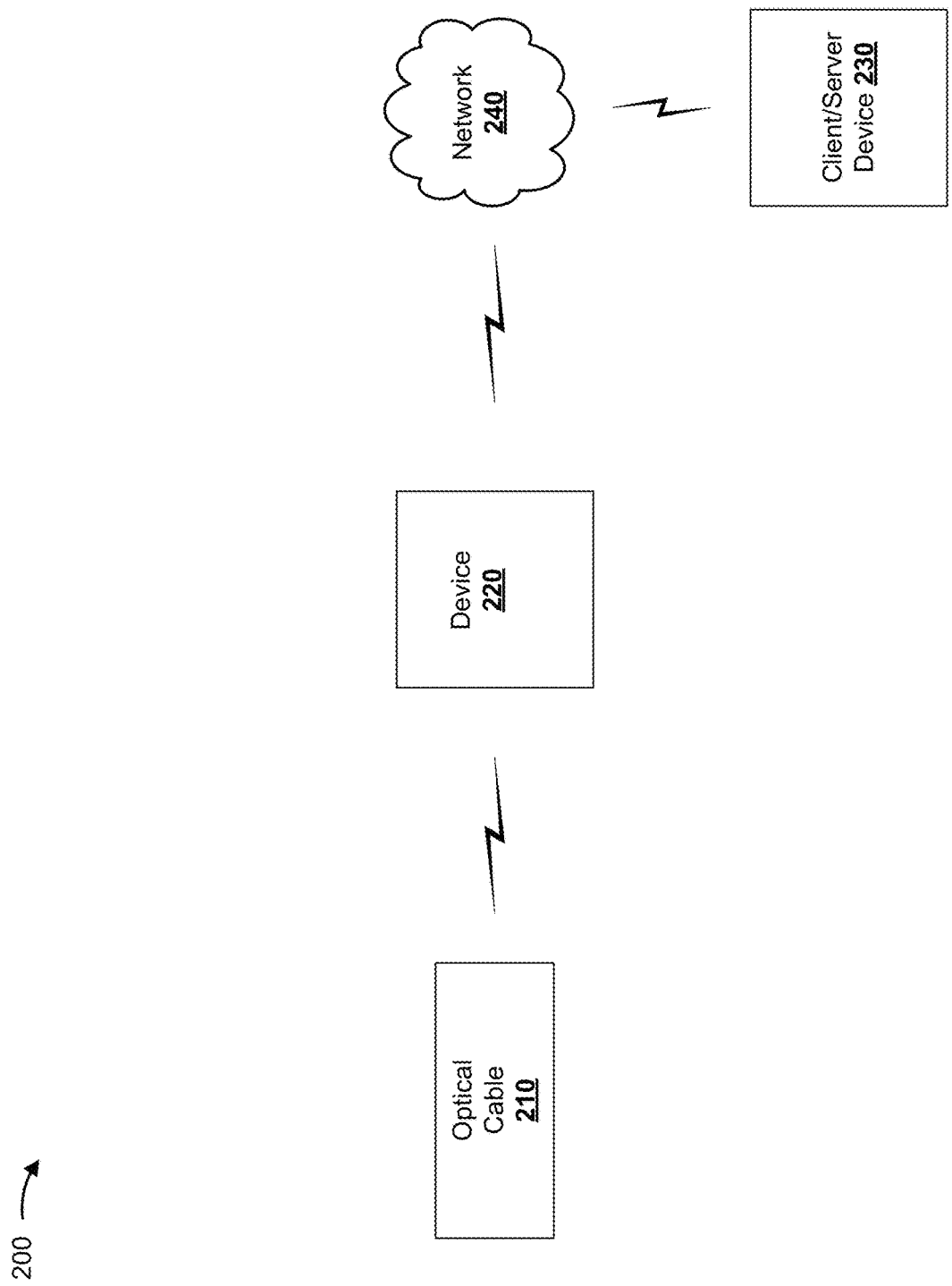
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include optical cable 210, device 220, client/server device 230, and network 240. Devices of environment 200 may interconnect via wired connections, wireless connections, or a combination of wired and wireless connections.

Optical cable 210 includes a cable containing one or more optical fibers that are used to carry light from a source device to a destination device. For example, optical cable 210 may include a ribbon optical cable, a loose tube optical cable, a drop optical cable, a central core cable, and/or a similar type of cable. In some implementations, optical cable 210 may be connected to device 220 (e.g., via an optical connector and/or a tip connector), as described elsewhere herein. Additionally, or alternatively, optical cable 210 may be analyzed by device 220 for damage, a defect, and/or the like, as described elsewhere herein.

Device 220 includes one or more devices capable of receiving, storing, generating, processing, and/or providing information related to an automatic analysis of a set of optical fibers of optical cable 210. For example, device 220 may include an optical probe, an optical fiber microscope, a fault locator, an optical fiber inspection microscope, and/or a similar type of device. In some implementations, device 220 may automatically perform an analysis of a set of optical fibers of optical cable 210, as described elsewhere herein. Additionally, or alternatively, device 220 may provide a result of an analysis for display (e.g., via a display of device 220 and/or client/server device 230), as described elsewhere herein.

Client/server device 230 includes one or more devices capable of receiving, generating, storing, processing, and/or providing information associated with an automatic analysis of a set of optical fibers of optical cable 210. For example, client/server device 230 may include a desktop computer, a mobile phone (e.g., a smart phone or a radiotelephone), a laptop computer, a tablet computer, a wearable communication device (e.g., a smart wristwatch or a pair of smart eyeglasses), a server device, a computing resource, or a similar type of device. In some implementations, client/server device 230 may receive information related to an analysis of optical cable 210 from device 220, as described elsewhere herein. Additionally, or alternatively, client/server device 230 may provide a result of an analysis of optical cable 210 for display, as described elsewhere herein. In some implementations, client/server device 230 may be associated with a cloud computing environment. In some implementations, client/server device 230 may receive a set of images, video, and/or data from device 220 and may perform an analysis of an optical fiber using the set of images, the video, and/or the data, as described elsewhere herein.

Network 240 includes one or more wired and/or wireless networks. For example, network 240 may include a wireless network (e.g., a long-term evolution (LTE) network, a code division multiple access (CDMA) network, a 3G network, a 4G network, a 5G network, a Wi-Fi network, or another type of wireless network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a cable, a near field communication connection, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
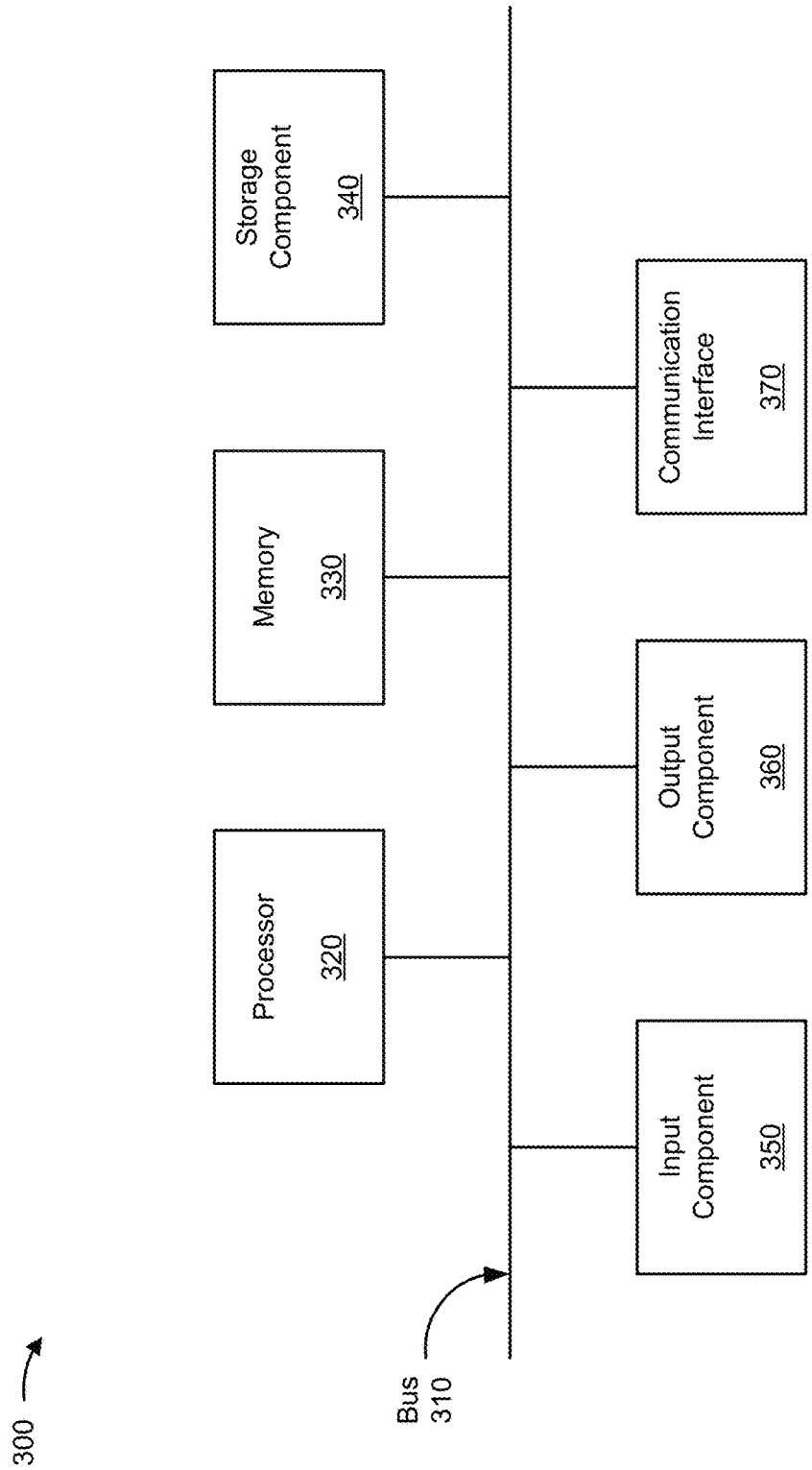
FIG. 3 is a diagram of example components of one or more devices of FIG. 2.

FIG. 3 is a diagram of example components of a device 300. Device 300 may correspond to device 220 and/or client/server device 230. In some implementations, device 220 and/or client/server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
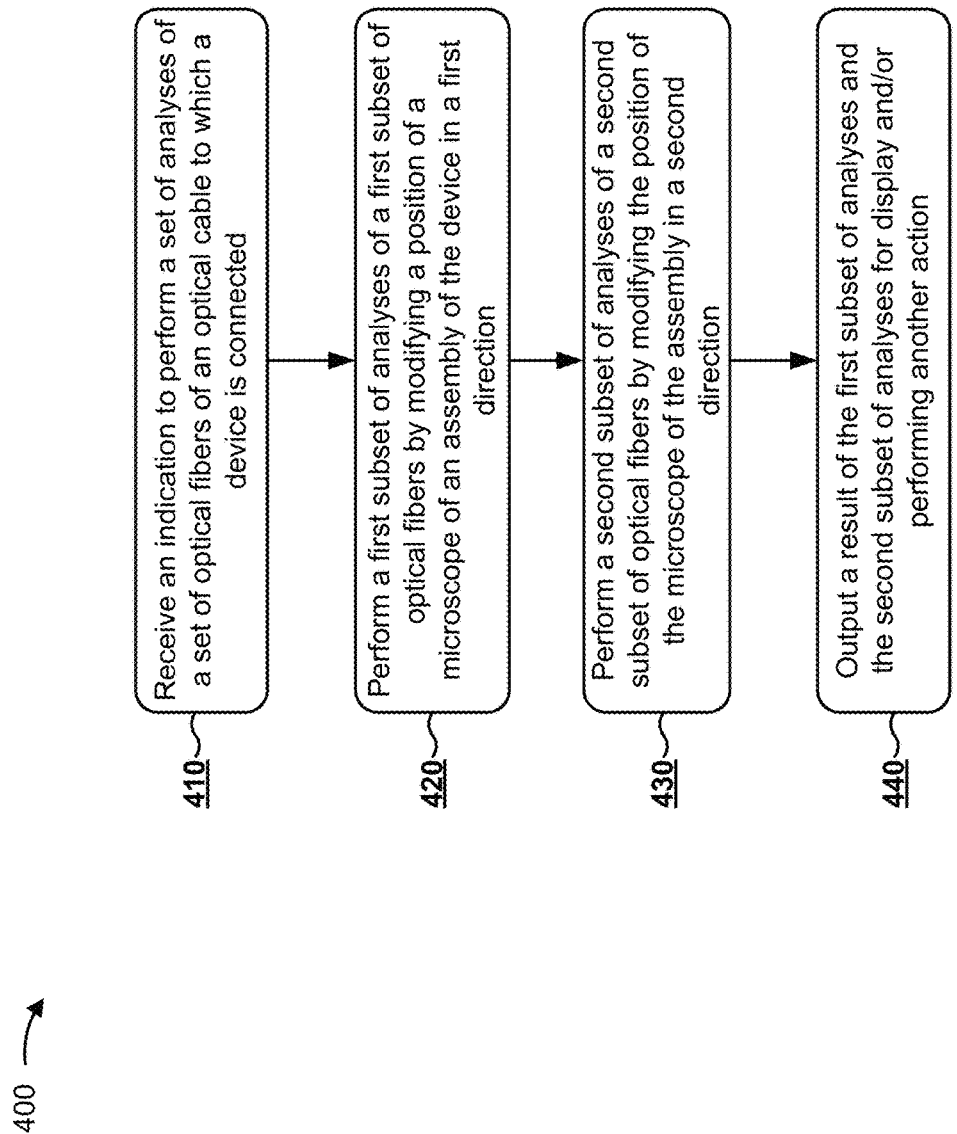
FIG. 4 is a flow chart of an example process for automatic analysis of a set of optical fibers of an optical cable.

FIG. 4 is a flow chart of an example process 400 for automatic analysis of a set of optical fibers of an optical cable. In some implementations, one or more process blocks of FIG. 4 may be performed by device 220. In some implementations, one or more process blocks of FIG. 4 may be performed by another device or a group of devices separate from or including device 220, such as client/server device 230.

As shown in FIG. 4, process 400 may include receiving an indication to perform a set of analyses of a set of optical fibers of an optical cable to which a device is connected (block 410). For example, device 220 may receive an indication to perform a set of analyses of a set of optical fibers of optical cable 210 to which device 220 is connected. In some implementations, device 220 may receive the indication based on detecting that device 220 has been connected to optical cable 210, based on input from a user of device 220, periodically, according to a schedule, and/or the like.

In some implementations, an optical fiber may include a transparent fiber composed of glass, silica, plastic, and/or the like that is included in optical cable 210. In some implementations, optical cable 210 may use an optical fiber to transmit light between two ends of optical cable 210, such as light used in fiber-optic communications. In some implementations, optical cable 210 may include a set of optical fibers. For example, the set of optical fibers may be arranged in an array (e.g., a one by 12 array, a three by nine array, a circular array, a polygonal array, or another shape or size of array). In some implementations, device 220 may perform an analysis of a set of optical fibers, as described in more detail elsewhere herein. In some implementations, an analysis may include an analysis of an optical fiber for a defect, damage, a threshold amount of power, a visual fault, and/or the like.

In this way, device 220 may receive an indication to perform a set of analyses of a set of optical fibers, to cause device 220 to perform a first subset of analyses of a first subset of optical fibers of optical cable 210.

As further shown in FIG. 4, process 400 may include performing a first subset of analyses of a first subset of optical fibers by modifying a position of a microscope of an assembly of the device in a first direction (block 420). For example, device 220 may perform a first subset of analyses of a first subset of optical fibers by modifying a position of a microscope associated with an assembly of device 220 in a first direction. In some implementations, device 220 may perform a first subset of analyses of a first subset of optical fibers after receiving an indication to perform a set of analyses (e.g., from a user of device 220), after detecting that an optical fiber of optical cable 210 is within a field of view of a lens associated with device 220 (as described in more detail below), and/or the like.

In some implementations, movement in a first direction may include movement that is parallel to a mating surface of optical cable 210 or about an axis parallel to a mating surface of optical cable 210. Similarly, in some implementations, movement in a first direction may include movement that is substantially parallel to, or about an axis that is substantially parallel to, a mating surface of optical cable 210. For example, movement that is substantially parallel to a mating surface of optical cable 210 may include an arcing movement, an angled movement, and/or the like.

In some implementations, a mating surface of optical cable 210 may include a surface of optical cable 210 where ends of optical fibers of optical cable 210 are exposed such that device 220, or a microscope of device 220, can perform an analysis of the optical fibers. Additionally, or alternatively, a mating surface of optical cable 210 may include a surface of optical cable 210 that device 220 (e.g., a microscope of an assembly of device 220) analyzes. In this way, an assembly of device 220 may move a microscope in a continuous manner about an axis that is substantially parallel to a mating surface of optical cable 210, and without moving the device, to bring a set of optical fibers of optical cable 210 within a field of view of the microscope without moving the optical cable.

In some implementations, an assembly may include a set of components of device 220 (e.g., within a housing of device 220). For example, an assembly may include a microscope (e.g., a lens, a camera, etc.), a set of motors (e.g., a set of step motors), a set of shafts, a set of cams, and/or other types of components related to analyzing an optical fiber and/or causing the microscope associated with the assembly to pivot about an axis, similar to that described above with respect to opto-mechanical assembly 112.

In some implementations, device 220 may use an assembly to analyze a set of optical fibers by causing a microscope associated with the assembly to pivot about an axis in a first direction such that each of the set of optical fibers are brought within the field of view of a lens included in the microscope associated with the assembly (e.g., in a continuous manner rather than a discrete manner, such as moving without pausing rather than moving to or between discrete positions). In some implementations, a microscope associated with an assembly of device 220 may move relative to a set of optical fibers being analyzed and independently of device 220 (e.g., without moving the set of optical fibers and/or device 220). In this way, device 220 may modify a position of a microscope associated with device 220 when analyzing a set of optical fibers.

In some implementations, when device 220 is initially connected to optical cable 210, a first optical fiber may be within the field of view of a lens of an assembly of device 220. For example, device 220 may perform a first analysis of the first optical fiber based on the first optical fiber being within the field of view of the lens of the microscope associated with the assembly.

In some implementations, and continuing still with the previous example, after device 220 has performed the first analysis, device 220 may pivot the microscope of the assembly in a first direction until a second optical fiber is within the field of view of the lens of the microscope of the assembly (e.g., rather than pivoting optical components of device 220, the microscope, and/or the assembly, such as a lens, a mirror, a prism, etc.). In some implementations, device 220 may pivot the microscope of the assembly in a first direction in a continuous manner rather than in a discrete manner. For example, rather than pivoting the microscope of the assembly to or between discrete positions, device 220 may pivot the microscope of the assembly without pausing, such as to perform an analysis, capture an image, and/or the like. This may permit device 220 to perform movement more efficiently, more efficiently perform analyses of optical fibers, and/or the like (e.g., relative to movement in a discrete manner). In some implementations, device 220 may perform a second analysis of the second optical fiber based on the second optical fiber being within the field of view of the lens of the microscope associated with the assembly.

In some implementations, device 220 may continue to pivot the microscope associated with the assembly in the first direction and perform analyses of optical fibers until device 220 determines that device 220 has performed an analysis of the last optical fiber in the set of optical fibers in a first direction. In some implementations, device 220 may determine that device 220 has performed an analysis of the last optical fiber of the set of optical fibers in the first direction. For example, device 220 may determine that device 220 has performed an analysis of the last optical fiber in the set of optical fibers in the first direction based on determining that device 220 has pivoted the microscope associated with the assembly a threshold distance without detecting an optical fiber, has pivoted the microscope associated with the assembly a threshold angle without detecting a fiber, has pivoted the microscope associated with the assembly a threshold distance greater than an average distance between other optical fibers, based on receiving an indication from a user of device 220, and/or the like.

In some implementations, device 220 may obtain a set of images and/or video of a set of optical fibers prior to performing an analysis. For example, device 220 may obtain an image of each optical fiber prior to performing an analysis of any of the optical fibers (e.g., rather than performing an analysis after capturing each image). In some implementations, device 220 may determine the bounds of optical cable 210 prior to performing an analysis of optical fibers of optical cable 210. For example, device 220 may determine a last optical fiber in a set of optical fibers, a diameter of optical cable 210, and/or the like prior to performing an analysis and/or capturing an image of an optical fiber.

In some implementations, device 220 may use a technique to perform an analysis. For example, device 220 may use image processing, shape detection, computer vision, and/or the like to perform an analysis. Continuing with the previous example, device 220 may use a camera mechanically supported by the assembly to capture an image and/or video of an optical fiber and may process the image to determine whether the optical fiber has damage, a defect, and/or the like. In some implementations, rather than capturing an image and/or video of each optical fiber in a set of optical fibers, device 220 may capture an image and/or video of a set of optical fibers and may process the image and/or video to determine whether each of the optical fibers has damage and/or a defect. In some implementations, device 220 may use a sensor (e.g., a light sensor, such as a photodiode), or a camera, to send and/or receive a light signal to perform an analysis of an optical fiber.

In some implementations, when performing an analysis of an optical fiber, device 220 may perform various actions, such as to prepare device 220 to perform the analysis. In some implementations, and for example, device 220 may focus the lens of the microscope associated with the assembly of device 220. For example, device 220 may automatically focus the lens so that a camera of the microscope of the assembly can capture an image and/or video of an optical fiber that can be processed (e.g., using an autofocus technique). Additionally, or alternatively, and as another example, device 220 may detect that an optical fiber is within a field of view of a lens of device 220. In some implementations, device 220 may detect that an optical fiber is within a field of view of a lens of device 220 using a technique. For example, device 220 may use image processing, computer vision, a shape detection technique (e.g., a circle detection technique, such as circle Hough Transform (CHT)), and/or the like to detect an optical fiber in a field of view of a lens of device 220.

In this way, device 220 may perform a first subset of analyses of a first subset of optical fibers starting at an arbitrary optical fiber in a set of optical fibers and modifying a position of a microscope of an assembly of device 220 in a first direction.

As further shown in FIG. 4, process 400 may include performing a second subset of analyses of a second subset of optical fibers by modifying the position of the microscope of the assembly in a second direction (block 430). For example, device 220 may perform a second subset of analyses of a second subset of optical fibers by modifying the position of the microscope of the assembly in a second direction. In some implementations, device 220 may perform a second subset of analyses of a second subset of optical fibers after performing an analysis of the last optical fiber of the first subset of optical fibers in the first direction.

In some implementations, a second direction may be an opposite direction of the first direction described above. For example, when device 220 modifies a position of the microscope of the assembly in a second direction, device 220 may pivot the microscope of the assembly about a pivot in an opposite direction of the first direction. In some implementations, when modifying a position of a microscope of device 220 in a second direction, device 220 may pivot the microscope of the assembly past an initial position of the microscope of the assembly (e.g., past the first optical fiber of the first subset that device 220 analyzed). In some implementations, device 220 may determine an initial position of the microscope of the assembly based on determining a distance that the microscope of the assembly pivoted about an axis, a determined distance between optical fibers in the first subset of optical fibers (e.g., an average distance), and/or the like. In some implementations, device 220 may pivot the microscope of the assembly past an initial position by a threshold distance, until device 220 detects an optical fiber, by an average distance between optical fibers included in the first subset, and/or the like.

In some implementations, a first direction and a second direction may be the same direction. For example, device 220 may perform an analysis of a set of optical fibers in a positive x direction until identifying the last optical fiber in the set of optical fibers, may move a microscope of an assembly of device 220 to the last fiber in a negative x direction, and may perform a set of analyses in a positive x direction toward an initial position of the microscope of the assembly (e.g., rather than performing the set of analyses as device 220 moves the microscope of the assembly in the negative x direction).

In some implementations, device 220 may modify a position of the microscope of the assembly in a second direction and may perform analyses of optical fibers in the second direction in a manner similar to that described above with respect to block 420. For example, device 220 may modify a position of a microscope of an assembly of device 220, rather than optical components of device 220, and may modify the position in a continuous manner rather than in a discrete manner, as described elsewhere herein. In some implementations, device 220 may determine the last optical fiber in the second subset of optical fibers in a manner similar to that described above with respect to the first subset.

In some implementations, rather than starting at an arbitrary position and performing a first subset of analyses and a second subset of analyses, as was described with respect to blocks 420 and 430, device 220 may perform an analysis of a set of optical fibers in a different manner. For example, device 220 may modify a position of the microscope of the assembly in a first direction until device 220 determines the last optical fiber in the first direction (e.g., without performing a set of analyses in the first direction). Continuing with the previous example, device 220 may then modify the position of the microscope of the assembly in a second direction and may perform an analysis of the set of optical fibers while modifying the position of the microscope of the assembly in the second direction until device 220 determines that device 220 has performed an analysis of the last optical fiber of the set of optical fibers in the second direction.

In this way, device 220 may perform a second subset of analyses of a second subset of optical fibers by modifying the position of the microscope of the assembly in a second direction to perform a set of analyses of the set of optical fibers.

As further shown in FIG. 4, process 400 may include outputting a result of the first subset of analyses and the second subset of analyses for display and/or performing another action (block 440). For example, device 220 may output a result of the first subset of analyses and the second subset of analyses for display and/or may perform another action. In some implementations, device 220 may output a result and/or perform another action after performing the first subset of analyses, the second subset of analyses, a threshold quantity of analyses, and/or the like.

In some implementations, a result may indicate whether a particular optical fiber has damage, whether a threshold quantity of optical fibers of the set of optical fibers have damage, an average result for the set of optical fibers, and/or the like. In some implementations, a result may identify all optical fibers of optical cable 210 and may further identify which optical fibers are damaged and which optical fibers are not damaged. This permits quick and efficient repair or replacement of optical fibers and/or optical cable 210. In some implementations, device 220 may output a result via a display of device 220. Additionally, or alternatively, device 220 may provide a result to client/server device 230 for display.

In some implementations, when outputting a result, device 220 may output a result of each analysis as device 220 is performing a set of analyses. Additionally, or alternatively, when outputting a result, device 220 may output a result after performing the set of analyses (e.g., rather than outputting a result of each analysis as device 220 is performing the set of analyses). In some implementations, device 220 may generate a report. For example, device 220 may generate a report that includes information identifying a result of performing the set of analyses by formatting information identifying a result into a report template, generating a graph or diagram related to a result, and/or the like. In some implementations, device 220 may provide a generated report for display. In some implementations, device 220 may provide a report by sending a message (e.g., an email, a short message services (SMS) message, etc.), provide a report to client/server device 230 (e.g., to improve future analyses by client/server device 230, to permit client/server device 230 to aggregate and analyze results from various sets of analyses, etc.), and/or the like. In some implementations, device 220 may trigger an alarm to indicate a result. For example, device 220 may output a sound, may activate a light, and/or the like to indicate a result.

In this way, device 220 may output a result of the first subset of analyses and the second subset of analyses for display and/or may perform another action.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
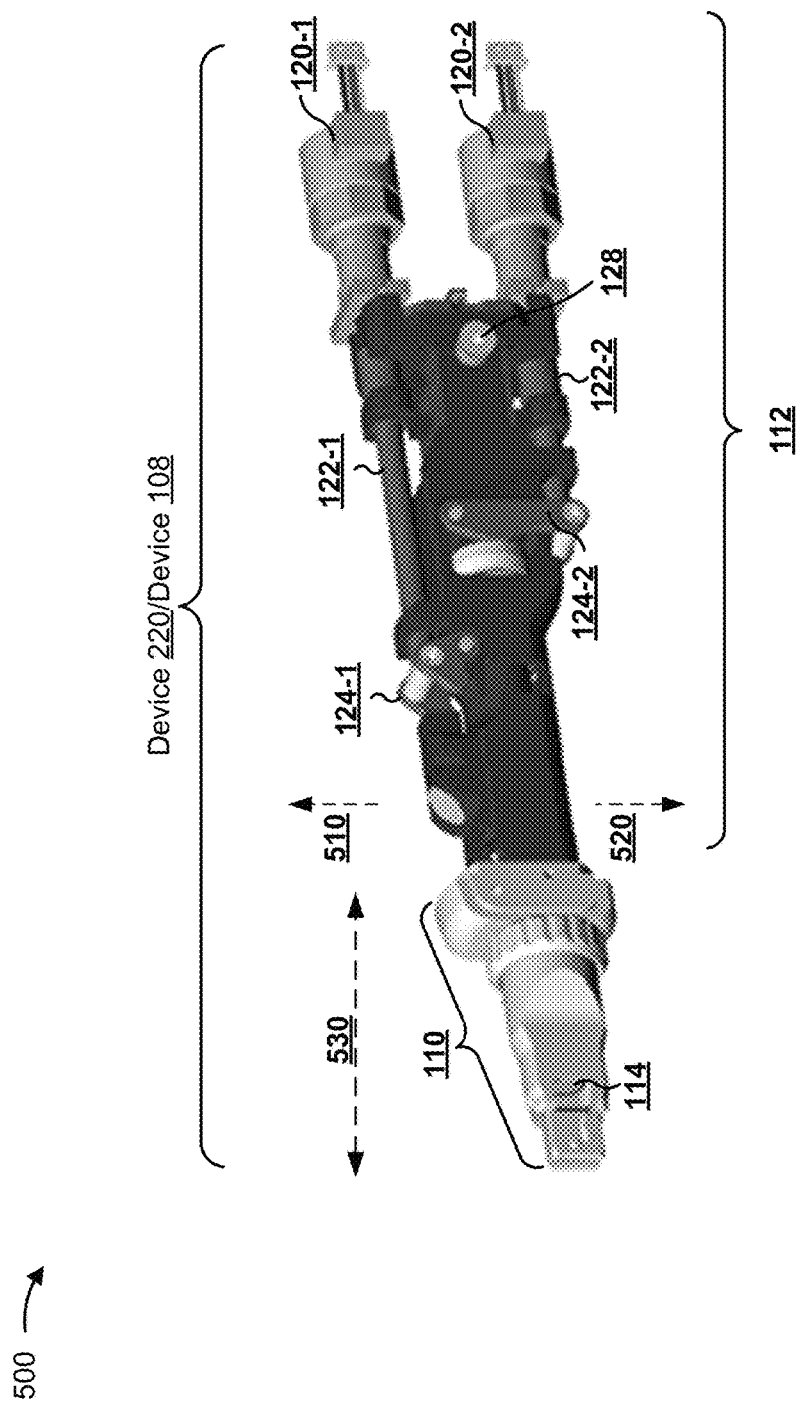
FIG. 5 is a diagram of an example implementation described herein.

FIG. 5 is a diagram of an example implementation 500 in which device 220 and/or device 108, described herein, may be implemented. FIG. 5 shows an example of an assembly (e.g., opto-mechanical assembly 112) associated with device 220 and/or device 108.

As shown in FIG. 5, and by reference number 510, a microscope of opto-mechanical assembly 112 may pivot in a positive x direction. For example, the microscope of opto-mechanical assembly 112 may pivot about pivot 128 in a positive x direction to permit device 220 to perform an analysis of a set of optical fibers in a positive x direction (e.g., via movement of motor 120-1, as described elsewhere herein). In some implementations, the microscope of opto-mechanical assembly 112, rather than optical components of device 220, may pivot about pivot 128 in the positive x direction. Additionally, or alternatively, the microscope of opto-mechanical assembly 112 may pivot about pivot 128 in the positive x direction in a continuous manner rather than in a discrete manner. As shown by reference number 520, a microscope of opto-mechanical assembly 112 may pivot in a negative x direction. For example, the microscope of opto-mechanical assembly 112 may pivot about pivot 128 in a negative x direction to permit device 220 to perform an analysis of a set of optical fibers in a negative x direction (e.g., via movement of motor 120-1, as described elsewhere herein). In some implementations, the microscope of opto-mechanical assembly 112, rather than optical components of device 220, may pivot about pivot 128 in the negative x direction. Additionally, or alternatively, the microscope of opto-mechanical assembly 112 may pivot about pivot 128 in the negative x direction in a continuous manner rather than in a discrete manner.

As shown by reference number 530, a microscope of opto-mechanical assembly 112 may move in a direction perpendicular to the positive and negative x directions (e.g., in a y direction). For example, the microscope of opto-mechanical assembly 112 may move in a positive y direction toward a left side of FIG. 5 via extension of shaft 122-2 by motor 120-2, as described elsewhere herein. Conversely, the microscope of opto-mechanical assembly 112 may move in a negative y direction toward a right side of FIG. 5 via retraction of shaft 122-2 by motor 120-2, as described elsewhere herein. In some implementations, movement in the y direction may permit opto-mechanical assembly 112 to focus lens 114 on an optical fiber so as to capture an image and/or video of the optical fiber that can be processed to identify damage, a defect, and/or the like.

As indicated above, FIG. 5 is provided merely as an example. Other examples are possible and may differ from what was described with regard to FIG. 5. For example, a microscope of opto-mechanical assembly 112 may be capable of additional movement other than that described with respect to FIG. 5. In addition, different components than those described with regard to FIG. 5 may perform the functions described herein.

Figure 6:
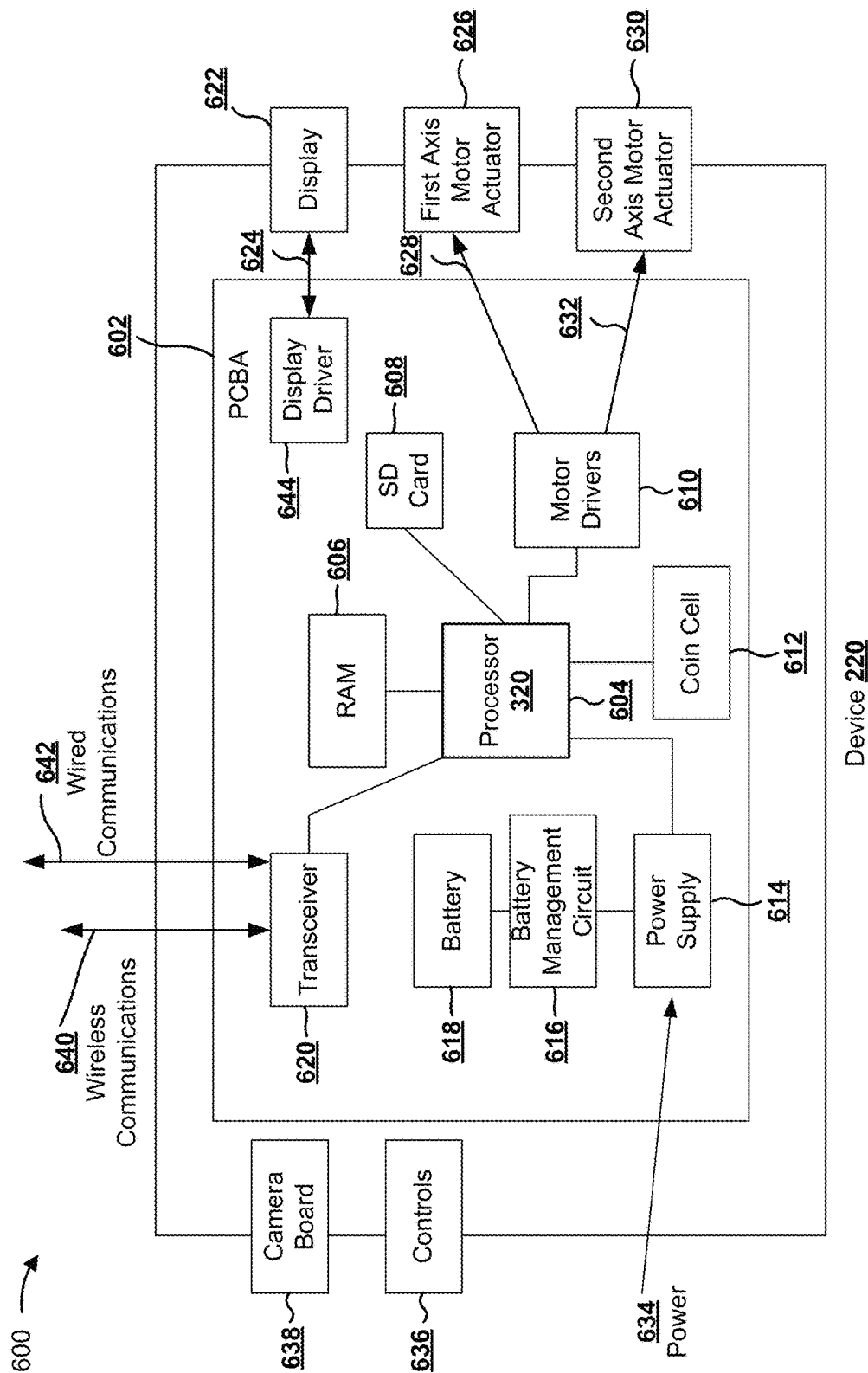
FIG. 6 is a diagram of an example implementation described herein.

FIG. 6 is a diagram an example implementation 600 described herein. FIG. 6 shows example components of device 220.

As shown in FIG. 6, and by reference number 602, device 220 may include a printed circuit board assembly (PCBA). For example, the PCBA may include a component capable of mechanically supporting and/or electrically connecting other components (e.g., of device 220). For example, the PCBA may include a circuit board, a mother board, a single-sided PCBA, a double-sided PCBA, a multi-layer PCBA, or a similar type of component. As shown by reference number 604, device 220 may include processor 320 (e.g., a microcontroller, such as an Atmel Cortex A5 microcontroller). As shown by reference numbers 606 and 608, device 220 may include various types of memory 330, such as RAM and a security digital (SD) card. As shown by reference number 610, device 220 may include a set of motor drivers (e.g., a set of motor controllers). For example, a motor driver may include one or more components that control a performance of a motor (e.g., motor 120). Continuing with the previous example, a motor driver may include a manual and/or automatic component for starting and/or stopping a motor, selecting a forward and/or reverse rotation, regulating speed of a motor, and/or the like.

As shown by reference number 612, device 220 may include a coin cell battery. For example, the coin cell battery may include a single cell battery to power one or more components of device 220. As shown by reference number 614, device 220 may include a power supply. For example, the power supply may include one or more components that provide electronic energy to device 220 to permit device 220 to perform functions described herein. As shown by reference number 616, device 220 may include a battery management circuit (e.g., a battery management system). For example, the battery management circuit may include one or more components that mange a battery (e.g., a rechargeable battery, a cell, a battery pack, etc.), such as by protecting the battery from operating in a particular manner, monitoring a state of the battery, and/or the like. In some implementations, the battery management circuit may be connected to the power supply and may manage a flow of electricity to and/or from a battery via the power supply.

As shown by reference number 618, device 220 may include a battery. For example, the battery may include one or more components (e.g., electrochemical cells) capable of providing power to electrical components of device 220. As further shown in FIG. 6, the battery may be connected to the battery management circuit, thereby permitting the battery to be charged, to be regulated, to provide power to processor 320, and/or the like. As shown by reference number 620, device 220 may include a transceiver (e.g., a wired transceiver or a wireless transceiver, such as a Wi-Fi radio, a Wi-Fi transceiver, a Bluetooth transceiver, etc.). For example, the transceiver may include one or more components capable of receiving and/or providing information via a wireless signal (e.g., Wi-Fi, Bluetooth, etc.).

As shown by reference number 622, device 220 may include a display (e.g., a liquid crystal display (LCD)). For example, the display may include one or more components capable of displaying information. As shown by reference number 624, the display may communicate with a PCBA to receive information to be displayed by the display, to provide information indicating a selection of a user to control functionality of processor 320 (e.g., when the display is a touch display), and/or the like.

As shown by reference number 626, device 220 may include a first axis motor actuator. For example, the first axis motor actuator may include one or more components capable of moving or controlling a motor in a first axis (e.g., an x direction as described above). As shown by reference number 628, the first axis motor actuator may be controlled by and/or receive commands from the set of motor drivers. As shown by reference number 630, device 220 may include a second axis motor actuator. The second axis motor actuator may be similar to the first axis motor actuator except that the second axis motor actuator may be associated with moving or controlling a motor in a second axis (e.g., a y direction as described above). As shown by reference number 632, the set of motor drivers may control the second axis motor actuator in a manner similar to that described above with respect to reference number 628.

As shown by reference umber 634, device 220 may receive power from an external component via the power supply. For example, device 220 may receive power via a universal serial bus (USB) port associated with device 220. As shown by reference number 636, device 220 may include various controls. For example, a control may include one or more components capable of providing information to processor 320 to control device 220, such as a button, a toggle, a switch, a keypad, and/or the like. As shown by reference number 638, device 220 may include a camera board. For example, a camera board may include one or more components, such as a PCBA and other components, related to a camera of device 220.

As shown by reference number 640, device 220 may communicate wirelessly using the transceiver. For example, device 220 may communication wirelessly with client/server device 230. As shown by reference number 642, device 220 may communicate via a wired connection. For example, device 220 may communicate with client/server device 230 via a USB connection. As shown by reference number 644, device 220 may include a display driver. For example, a motor driver may include one or more components that control a performance of a display of device 220 (e.g., when to power off automatically, a manner in which information is displayed, etc.).

As indicated above, FIG. 6 is provided as an example. Other examples are possible and may differ from what was described with regard to FIG. 6. In addition, the number and arrangement of components of FIG. 6 are provided as an example. In practice, implementation 600 may include different components, or differently arranged components than those shown in FIG. 6. Additionally, or alternatively, a set of components (e.g., one or more components) of implementation 600 may perform one or more functions described as being performed by another set of components of implementation 600.

Although implementations were described with respect to particular planes (e.g., an x direction), such references were provided as examples and the implementations apply equally to other planes. For example, movement in an x direction may be described as movement in a y direction, a z direction, an x-y direction, an x-z direction, etc.

Some implementation, described herein, provide a device (e.g., a handheld device, such as a handheld microscope) that includes an assembly for analyzing a set of optical fibers that can pivot a microscope about an axis so as to modify a field of view of the device (e.g., without moving the set of optical fibers). In addition, the device may be capable of automatically analyzing a set of optical fibers for defects, damage, and/or the like. In this way, the device may automatically analyze a set of optical fibers without moving the set of optical fibers. This reduces or eliminates a need to move the set of optical fibers to analyze the set of optical fibers. In addition, this increases an efficiency, an accuracy, and an objectivity of analyzing a set of optical fibers via automatic analysis of the set of optical fibers, thereby conserving processing resources of the device that would otherwise be consumed performing multiple analyses to correct for missed optical fibers, fixing optical fibers that were inaccurately identified as damaged and/or defective, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
   an assembly to modify, without moving the device, an angle of pivot of a microscope in a continuous manner about an axis to bring one or more optical fibers, of a set of optical fibers of an optical cable, within a field of view of the microscope without moving an optical cable; and
   one or more processors configured to:
   receive an indication to perform a set of analyses of the set of optical fibers;
   perform the set of analyses by modifying a position of the microscope in a set of directions to modify the angle of pivot; and
   provide a result of the set of analyses.

2. The device of claim 1, further comprising:
   a pivot that permits modification of the angle of pivot.

3. The device of claim 1, where the one or more processors are configured to:
   autofocus the microscope based on the angle of pivot.

4. The device of claim 1, where the one or more processors are further configured to:
   determine that an optical fiber, of the set of optical fibers, is within the field of view of the microscope; and
   where the one or more processors, when performing the set of analyses, are to:
   perform an analysis, of the set of analyses, of the optical fiber after determining that the optical fiber is within the field of view of the microscope.

5. The device of claim 1, where the one or more processors, when performing the set of analyses, are configured to:
   perform a first subset of analyses of a first subset of optical fibers in a first direction of the set of directions; and
   where the one or more processors, when providing the result, are to:
   provide a result of the first subset of analyses.

6. The device of claim 5, where the one or more processors, when performing the set of analyses, are configured to:

perform a second subset of analyses of a second subset of optical fibers in a second direction of the set of directions, the first direction and the second direction being different, and the first subset of optical fibers and the second subset of optical fibers being different; and where the one or more processors, when providing the result, are to:

provide a result of the second subset of analyses.

7. The device of claim 1, where the one or more processors are further configured to:

modify the position of the microscope in a first direction, of the set of directions, to determine a last optical fiber of the set of optical fibers; and where the one or more processors, when performing the set of analyses, are to:

perform the set of analyses after modifying the position of the microscope in a second direction, the second direction and the first direction being different.

8. The device of claim 1, where the one or more processors are further configured to:

modify the position of the microscope about a first axis that is substantially perpendicular to the axis and substantially parallel to a mating surface of the optical cable, or modify the position of the microscope about a second axis that is substantially perpendicular to the axis and substantially perpendicular to the mating surface of the optical cable.

9. A device comprising:

one or more components associated with a microscope; and an assembly that can modify an angle of pivot of the one or more components, in a continuous manner, about an axis substantially parallel to a mating surface of a optical cable to bring a set of optical fibers of the optical cable within a field of view of the one or more components without moving the optical cable and without moving the device, the one or more components including:
a camera, and
a lens associated with the camera,
the assembly including:
a set of motors.

10. The device of claim 9, further comprising:
a camera board associated with the camera; and
a display.

11. The device of claim 9, further comprising:
a set of controls;
a set of actuators; and
a set of motor drivers,
the set of controls, the set of actuators, and the set of motor drivers being associated with the set of motors.

12. The device of claim 9, further comprising:
a printed circuit board assembly comprising a processor and one or more types of memory components.

13. The device of claim 12, further comprising:
a coin cell connected to the processor,
a battery;
a battery management circuit connected to the battery management circuit; and
a power supply connected to the battery management circuit and the processor.

14. The device of claim 9, further comprising:
a transceiver.

15. A method comprising:
receiving, by a device, an indication to perform a set of analyses of a set of optical fibers of an optical cable to which the device is connected;
performing, by the device, the set of analyses of the set of optical fibers by modifying a position of a microscope of an assembly of the device in a set of directions,
the assembly to modify an angle of pivot of the microscope, in a continuous manner, to bring each optical fiber, of the set of optical fibers, within a field of view of the microscope without moving the optical cable and without moving the device, and
the microscope to be used to perform the set of analyses;
determining, by the device, results of performing the set of analyses; and
performing, by the device, an action related to the results of the set of analyses.

16. The method of claim 15, further comprising:
determining that an optical fiber, of the set of optical fibers, is a last optical fiber in a first direction, of the set of directions; and
where performing the set of analyses comprises:
performing the set of analyses in a second direction, of the set of directions, after determining that the optical fiber is the last optical fiber,
the first direction and the second direction being different.

17. The method of claim 15, where performing the set of analyses comprises:
performing a first subset of analyses in a first direction, of the set of directions; and
outputting the results of the first subset of analyses.

18. The method of claim 17, where performing the set of analyses comprises:
performing a second subset of analyses in a second direction, of the set of directions; and
outputting the results of the second subset of analyses.

19. The method of claim 15, further comprising:
detecting each optical fiber of the set of optical fibers within the field of view using:
image processing,
computer vision, or
a shape detection technique.

20. The method of claim 15, where the device is a handheld device.

* * * * *